United States Patent
Prior Pinto Oliveira et al.

(10) Patent No.: US 11,918,007 B2
(45) Date of Patent: Mar. 5, 2024

(54) FOODSTUFF COMPOSITION COMPRISING A DERIVATE OF OLIVE POMACE

(71) Applicant: UNIVERSIDADE DO PORTO, Oporto (PT)

(72) Inventors: Maria Beatriz Prior Pinto Oliveira, Oporto (PT); Maria Antónia Da Mota Nunes, Oporto (PT); Anabela Sílvia Guedes Da Costa, Oporto (PT)

(73) Assignee: UNIVERSIDADE DO PORTO, Oporto (PT)

( * ) Notice: Subject to any disclaimer, the term of this patent is extended or adjusted under 35 U.S.C. 154(b) by 472 days.

(21) Appl. No.: 16/954,060

(22) PCT Filed: Dec. 14, 2018

(86) PCT No.: PCT/IB2018/060111
§ 371 (c)(1),
(2) Date: Jun. 15, 2020

(87) PCT Pub. No.: WO2019/116343
PCT Pub. Date: Jun. 20, 2019

(65) Prior Publication Data
US 2021/0076697 A1  Mar. 18, 2021

(30) Foreign Application Priority Data
Dec. 14, 2017 (PT) .......................... 110455

(51) Int. Cl.
*A23D 7/005* (2006.01)
*A23D 7/01* (2006.01)
(Continued)

(52) U.S. Cl.
CPC ........... *A23D 7/0056* (2013.01); *A23D 7/013* (2013.01); *A23L 33/105* (2016.08); *B01D 17/0217* (2013.01); *A23V 2002/00* (2013.01)

(58) Field of Classification Search
CPC .............. A23V 2002/00; A23L 33/105; B01D 17/0217; A23D 7/0056; A23D 7/013
See application file for complete search history.

(56) References Cited

U.S. PATENT DOCUMENTS

2007/0207944 A1* 9/2007 Edens ....................... A61P 3/02
435/68.1
2010/0056463 A1* 3/2010 Raederstorff .......... A61K 31/05
514/23
(Continued)

FOREIGN PATENT DOCUMENTS

DE  10356441 A1  4/2005
EP  1922933 A1  5/2008
(Continued)

OTHER PUBLICATIONS

International Search Report and Written Opinion for corresponding PCT Application No. PCT/IB2018/060111 dated Apr. 5, 2019 (17 pages).
(Continued)

*Primary Examiner* — Jianfeng Song
(74) *Attorney, Agent, or Firm* — Leason Ellis LLP

(57) ABSTRACT

The present disclosure relates to a foodstuff composition, in particular a spreadable food composition, more in particular an olive oil-based functional spread fat composed by olive oil fortified with a functional ingredient—the olive pomace active ingredient. This functional ingredient is a mixture of bioactive compounds, in particular hydroxytyrosol, tyrosol, sterols, tocopherols, triterpenes, coenzyme Q10, K, Mg and Ca, among others, obtained from olive pomace by mechanical pressing.

12 Claims, 4 Drawing Sheets

(51) Int. Cl.
*A23L 33/105* (2016.01)
*B01D 17/02* (2006.01)

(56) References Cited

U.S. PATENT DOCUMENTS

| | | | |
|---|---|---|---|
| 2013/0178537 | A1 | 7/2013 | Lopez Mas et al. |
| 2014/0023712 | A1* | 1/2014 | Helgason .............. A61K 47/08 426/540 |
| 2016/0250272 | A1 | 9/2016 | Lo Franco et al. |
| 2016/0256507 | A1 | 9/2016 | Lo Franco et al. |

FOREIGN PATENT DOCUMENTS

| | | |
|---|---|---|
| EP | 1953133 A1 | 8/2008 |
| EP | 2338500 A1 | 6/2011 |
| EP | 2687103 A1 | 1/2014 |
| EP | 2526785 B1 | 6/2017 |
| JP | 2009291107 A | 12/2009 |
| WO | WO0036936 A2 | 6/2000 |
| WO | 0218310 A1 | 3/2002 |
| WO | 2009013596 A2 | 1/2009 |
| WO | 2011101521 A1 | 8/2011 |
| WO | 2017108275 A1 | 6/2017 |
| WO | 2018109600 A1 | 6/2018 |
| WO | 2018189730 A1 | 10/2018 |

OTHER PUBLICATIONS

Patrícia Ramos et al., "Valorization of olive mill residues: Antioxidant and breast cancer antiproliferative activities of hydroxytyrosolrich extracts derived from olive oil byproducts", Industrial Crops and Products, Feb. 2013, pp. 359-368.

Mariana Araújo et al., "Phenolic compounds from olive mill wastes: Health effects, analytical approach and application as food antioxidants", Trends in Food Science & Technology, Jun. 2015, pp. 200-211.

Stefania Bulotta et al., "Beneficial effects of the olive oil phenolic components oleuropein and hydroxytyrosol: focus on protection against cardiovascular and metabolic diseases", Journal of Translational Medicine, Dec. 2014, pp. 1-9.

Imed Hassen et al., "Biological activities of the natural antioxidant oleuropein: Exceeding the expectation—A mini- review", Journal of Functional Foods, Sep. 2014, pp. 926-940.

Ting Hu et al., "Hydroxytyrosol and Its Potential Therapeutic Effects", Journal of Agricultural and Food Chemistry, Jan. 2014, pp. 1449-1455.

Bahar Aliakbarian et al, "Use of Supercritical Assisted Atomization to produce nanoparticles from olive pomace extract", Innovative Food Science and Emerging Technologies, Sep. 2016, pp. 2-9.

Panayotis S. Rodis et al., "Partitioning of Olive Oil Antioxidants between Oil and Water Phases", Journal of Agricultural and Food Chemistry, Jan. 2002, pp. 596-601.

Katja Žmitek et al., "Factors Influencing the Contents of Coenzyme Q10 and Q9 in Olive Oils", Journal of Agricultural and Food Chemistry, Mar. 2014, pp. 3211-3216.

Jenny Zegler, "Global Food & Drink Trends 2017", mintel.com, Jan. 2017, 20 pages.

A.M. Quintieri et al., "The innovative "Bio-Oil Spread" prevents metabolic disorders and mediates preconditioning-like cardioprotection in rats", Nutrition, Metabolism & Cardiovascular Diseases, Feb. 2016, pp. 603-613.

István Siró, "Functional food. Product development, marketing and consumer acceptance—A review", Appetite, May 2008, pp. 456-467.

* cited by examiner

FOODSTUFF COMPOSITION COMPRISING A DERIVATE OF OLIVE POMACE

CROSS-REFERENCE TO RELATED APPLICATIONS

This application is a U.S. National Stage Application under 35 U.S.C. § 371 of International Patent Application No. PCT/IB2018/060111, filed Dec. 14, 2018, which claims priority to Portugal Patent Application No. 110455, filed Dec. 14, 2017, the contents of which are each hereby incorporated by reference in their respective entireties.

TECHNICAL DOMAIN

The present disclosure relates to a foodstuff composition, in particular a spreadable food composition, more in particular an olive oil-based functional spread fat composed by olive oil fortified with a functional ingredient—the olive pomace active ingredient.

This functional ingredient is a mixture of bioactive compounds, in particular hydroxytyrosol, tyrosol, sterols, tocopherols, triterpenes, coenzyme Q10, K, Mg and Ca, among others, obtained from olive pomace by mechanical pressing.

TECHNICAL BACKGROUND

Olive oil is widely consumed and appreciated in the Mediterranean countries being one of the major ingredients of the Mediterranean diet. It consumption has been associated with beneficial effects on cardiovascular risk factors due to its high levels in bioactive compounds (Bulotta, S., Celano, M., Lepore, S. M., Montalcini, T., Pugia, A., Russo, D., Beneficial effects of the olive oil phenolic components oleuropein and hydroxytyrosol: focus on protection against cardiovascular and metabolic diseases. Journal of Translational Medicine 2014, 12, 219-219).

Olive oil is rich in monounsaturated fatty acids, such as oleic acid, with well-known cardiovascular benefits (Hansen, I., Casabianca, H., Hosni, K., Biological activities of the natural antioxidant oleuropein: Exceeding the expectation—A mini-review. Journal of Functional Foods 2015, 18, Part B, 926-940). The production and consumption of olive oil is steadily rising all over the world. During its processing, several by-products are generated. Olive pomace, as example of the referred above, emerges as a very promising by-product to be valorised in order to obtain bioactive compounds. Olive pomace is a residue with high water and oil contents ($\approx$70 and 3%, respectively) with a significant phenolics amount, dependent of the plant cultivar, degree of ripening, edaphoclimatic conditions, and used processing methodologies (Hu, T., He, X.-W., Jiang, J.-G., Xu, X.-L., Hydroxytyrosol and Its Potential Therapeutic Effects. Journal of Agricultural and Food Chemistry 2014, 62, 1449-1455).

As the production of olive oil is increasing, the olive pomace discharge is also escalating. This product is phytotoxic due to its great amounts in phenolic compounds. It is discharged and stored in large open-air containers, being considered an emergent environmental burden that needs to be solved (Aliakbarian, B., Paini, M., Adami, R., Perego, P., Reverchon, E., Use of Supercritical Assisted Atomization to produce nanoparticles from olive pomace extract. Innovative Food Science & Emerging Technologies 2017 40, 2-9).

Phenolic compounds are released during olive oil processing being distributed into water and oil phases, accordingly to their chemical composition. As only a minimal phenolic fraction passes into the oil phase (2%), the majority of phenolics from olive fruit (98%), namely hydroxytyrosol and its derivatives, remain in olive pomace (Rodin, P. S., Karathanos, V. T., Mantzavinou, A., Partitioning of Olive Oil Antioxidants between Oil and Water Phases. Journal of Agricultural and Food Chemistry 2002, 50, 596-601). Additionally, beneficial compounds as sterols, tocopherols, triterpenes, coenzyme Q10 and squalene can be present in olive pomace, mostly in its unsaponifiable matter. This matrix is also rich in K, Mg and Ca, important for blood pressure regulation, and in other water-soluble compounds (mitek, K., Rodríguez-Aguilera, J. C., Prayst, I., Factors Influencing the Contents of Coenzyme Q10 and Q9 in Olive Oils. Journal of Agricultural and Food Chemistry 2014, 62, 3211-3216).

Cardiovascular diseases are the leading cause of mortality. Several studies have been pointing out an inverse correlation between cardiovascular diseases and specific phytochemicals intake, such as hydroxytyrosol. The benefits of this compound have been highlighted on cardiovascular system due to its antiplatelet aggregation, antioxidant and anti-inflammatory activities. The European Food Safety Authority (EFSA) claimed that the daily consumption of 5 mg of hydroxytyrosol could protect low-density lipoproteins (LDL) from oxidative damage (Hu, T., He, X.-W., Jiang, J.-G., Xu, X.-L., Hydroxytyrosol and Its Potential Therapeutic Effects. Journal of Agricultural and Food Chemistry 2014, 62, 1449-1455).

Nowadays, consumers have been changing their attitude toward agro-food wastes, paying more attention to innovative products that include natural ingredients obtained from agro by-products (Mintel: Global Market Research. Food & Drink Trends 2017, 1-9).

Patents related with "spreadable olive oil" and "olive pomace" have been developed: "Anti-inflammatory use of liquid phytocomplexes from olive" (US2016256507 (A1)—2016 Sep. 8); "Antiangiogenic use of liquid phytocomplexes from olive" (US2016250272 (A1)—2016 Sep. 1); "Olive oil containing high concentration of polyphenol" (JP2009291107 (A)—2009 Dec. 17); "Food composition based on olive oil" (WO2011101521 (A1)—2011 Aug. 25); "Nutritionally beneficial, spreadable edible fat with low saturated fatty acid and cholesterol content, obtained by homogeneously mixing butter with oil, e.g. olive oil, then cooling to give spreadable consistency" (DE10356441 (A1)—2005 Apr. 14); "Process for preparing a fat slurry comprising olive oil and for preparing a spread with said slurry (WO2017108275 (A1)—2017 Jun. 29). An Italian research group has been developing "Bio-Oil Spread" also based in olive oil by a new process named organogelation (Quintieri, A. M., Filice, E., Amelio, D., Pasqua, T., et al., The innovative "Bio-Oil Spread" prevents metabolic disorders and mediates preconditioning-like cardioprotection in rats. Nutrition, Metabolism and Cardiovascular Diseases 2016, 26, 603-613).

Some brands, in USA, Greece, United Kingdom and Australia, commercialize vegetable creams with several vegetables oil mixtures, including olive oil, but in low content and not based in a green methodology that recovers the active ingredient from the olive pomace. In Portugal, research groups and small businesses based in traditional methods are presenting spreadable olive oil.

The olive oil-based functional spread fat is distinguishable from others by the nature of the added ingredient. The active ingredient is a mixture of bioactive compounds present in the oil and aqueous phases obtained from olive pomace pressing. Moreover, the origin, process of obtention, and the bioactions of the added active ingredient inputs special features to the olive oil-based functional spread fat. Therefore, the formulation ingredients altogether allow a synergistic effect i.e. the active ingredient derived from olive pomace and the olive oil bioactive compounds attributes functional properties to the final product. A functional food has, in addition to providing basic nutrition, other attributes that have a direct positive effect on health and well-being and even on reduction of disease risk. Therefore, a food product can be considered "functional" only if it is demonstrated a beneficial effect in one or more functions of human body. However, "functional" foods must remain as foods and their beneficial effects must be stated when consumed in normal daily amounts as expected for that product (Siró, I., Kápolna, E., Kápolna, B., Lugasi, A., Functional food. Product development, marketing and consumer acceptance—A review. Appetite 2008, 51, 456-467).

By itself, olive oil is valued by its organoleptic properties and health benefits. Hereby, a differentiated position of the olive oil-based functional spread fat into the olive oil market is proposed. The addition of an active ingredient derived from olive pomace to olive oil, its transformation into a spreadable matrix with health claimed benefits has not been yet developed. There is not in the market any product that includes this product features. In addition, it will generate new industrial players in the olive oil processing industry with a positive socio-economic impact.

These facts are disclosed in order to illustrate the technical problem addressed by the present disclosure.

GENERAL DESCRIPTION

The present disclosure relates to a foodstuff composition, in particular a spreadable food composition, more in particular an olive oil-based functional spread fat composed by olive oil fortified with a functional ingredient—the olive pomace active ingredient.

An aspect of the present disclosure relates to a foodstuff composition, a spreadable food composition, more in particular an olive oil-based functional spread fat composed by olive oil fortified with a functional ingredient—the olive pomace active ingredient; comprising:
  a comestible active ingredient derived from olive pomace,
  at least a compound selected from the list consisting of: hydroxytyrosol, tyrosol, comsegoloside, verbascoside, or combinations thereof;
  wherein the composition comprises at least 5 mg of the compound per portion or per unit of foodstuff composition; preferably 5 $mg_{compound}/10\ g_{foodstuff\ composition}$.

In an embodiment, the foodstuff composition may comprise an oil phase and an aqueous phase,
  wherein the oil phase is olive oil and
  the aqueous phase comprises a comestible active ingredient derived from olive pomace,
  compound selected from the list consisting of: hydroxytyrosol, tyrosol, comsegoloside, verbascoside, or combinations thereof,
  wherein the composition comprises at least 5 mg of the compound per portion or per unit of foodstuff composition, preferably 5 $mg_{compound}/10\ g_{foodstuff\ composition}$.

In an embodiment, the foodstuff composition may comprise at least 5 mg of hydroxytyrosol per portion or per unit of foodstuff composition.

In an embodiment, the present disclosure relates to a spreadable food composition comprising an oil phase and an aqueous phase,
  wherein the oil phase is olive oil and
  the aqueous phase comprises a comestible active ingredient derived from olive pomace,
  wherein the composition further comprises at least 5 $mg_{compound}/10\ g_{spreadable\ food\ composition}$ of a compound selected from the list consisting of: hydroxytyrosol, tyrosol, comsegoloside, verbascoside, or combinations thereof.

In an embodiment, the foodstuff composition is a spreadable food composition.

In an embodiment, the foodstuff composition may comprise at least 5 $mg_{compound}/10\ g_{foodstuff\ composition}$ of hydroxytyrosol.

In an embodiment, the compound may be hydroxytyrosol.

In an embodiment, the comestible active ingredient may comprise a concentration of the compound, for example hydroxytyrosol, tyrosol, comsegoloside, verbascoside, or combinations thereof, varying between 2.26 g/L-0.01 g/L.

In an embodiment, the comestible active ingredient may comprise a concentration of the compound of at least 2.26 g/L, preferably the content of hydroxytyrosol.

In an embodiment, the comestible active ingredient may comprise a concentration of the compound of at least 0.11 g/L, preferably the content of tyrosol.

In an embodiment, the comestible active ingredient may comprise a concentration of the compound of at least 0.03 g/L, preferably the content of comsegoloside.

In an embodiment, the comestible active ingredient may comprise a concentration of the compound of at least 0.12 g/L, preferably the content of verbascoside.

In an embodiment, the spreadable food composition may further comprise pectin, gelatin, oleogelators, or combinations thereof.

In an embodiment, the spreadable food composition may further comprise herbs, spices, emulsifiers, thickeners, preservatives, flavours, colourants, lipophilic vitamins, or combinations thereof.

In an embodiment, the spreadable food composition may further comprise mono- and diglycerides of fatty acids, distilled monoglycerides of fatty acids, citric acid esters of mono- and diglycerides of fatty acids, lecithins, polyglycerol polyricinoleate (PGPR), starch, gellam gum, locust bean gum, xanthan gum, potassium sorbate, alginate, maltodextrin, citric acid, carotenes, or combinations thereof.

In an embodiment, the spreadable food may further comprise propyl gallate, tocopherol, ascorbic acid, or combinations thereof.

In an embodiment, the spreadable food composition may further comprise cocoa, honey, syrups, cinnamon, garlic, rosemary, oregano, basil, algae, or combinations thereof.

In an embodiment, the active ingredient derived from olive pomace has at least 9695 mg gallic acid equivalents/L of total phenolics.

In an embodiment, the active ingredient derived from olive pomace has at least 8265 mg epicatechin equivalents/L of total flavonoids.

Another aspect of the present disclosure relates to the use of the composition described in the present subject-matter as a comestible spreadable cream.

Another aspect of the present disclosure relates to a process for extracting a comestible active ingredient derived from olive pomace composition described in the present subject-matter, comprising the following steps:
  malaxating of olive pomace;
  compressing the olive pomace;
  separating a solid phase from an oil phase and from an aqueous phase;

discharging the solid phase;
centrifugating the oil phase and the aqueous phase.

In an embodiment, the step of compressing is carried out at 50-300 bar, in particular 200-300 bar.

In an embodiment, the step of centrifugation is carried out at 5000 rpm for 5 min, preferably for 20 min.

Another aspect of the present disclosure relates to a foodstuff composition, in particular a spreadable food composition, comprising a comestible active ingredient, wherein the comestible active ingredient is obtainable by the process described in the present subject-matter The olive oil based functional spread fat comprises a fat phase—olive oil—and an aqueous phase which contains the olive pomace active ingredient and/or hydroxytyrosol wherein the amount of hydroxytyrosol is at minimum 5 mg per portion or consumption unit, wherein per portion means a portion of 10 g.

The active ingredient derives from olive pomace. Olive pomace is the raw material obtained directly from olive mills. The active ingredient is obtained by extracting the remaining olive fat and water by repeating the phase of malaxation followed by the olive pomace pressing.

The olive pomace active ingredient is extracted physically from olive pomace: it is natural, plant-based, and obtained without chemicals. The process to obtain the active ingredient comprises the following (Step (1)) (FIG. 1):
  a. Malaxation of olive pomace;
  b. Compression (50-300 bar, preferably 200-300 bar) of olive pomace;
  c. Separation of the liquid phase (water and oil) from solid phase (olive skin, pulp, stone and kernel);
  d. Removal of the solid phase;
  e. Centrifugation of the liquid phase, preferably at 5000 rpm during 20 min for a total mass pressed of ≈50 g.

A hydraulic press is used to press olive pomace (FIG. 2). The active ingredient has high in vitro antioxidant activity, total phenolic compounds and hydroxytyrosol contents. The major elements present are K>Ca>S>Si>P. Also, it presents 1% of olive fat, 0.9% of protein, and a total soluble solids value of 14° Brix.

This product pretends to be an alternative to other spreadable fats available in the market, distinguishable from them by its functionality related to the bioactive compounds content, high amount in monounsaturated fatty acids, and lactose-free.

The well-known nutritional value of olive oil has been associated to its bioactive compounds namely the monounsaturated and polyunsaturated fatty acids, polyphenols, phytosterols, triterpenic acids, pigments, tocopherols, and squalene. Oleic acid is the major fatty acid in olive oil representing 55-83% of the total fatty acids whereas polyunsaturated fatty acids represent 4 to 20% and saturated fatty acids, 8 to 14%. Several cardiovascular benefits were established namely related to benefits on plasma lipids profile. Federal Drug Administration (FDA) allowed a claim on olive oil labels: "the benefits on the risk of coronary heart disease of eating about two tablespoons (i.e., 23 g) of virgin olive oil daily, due to the monounsaturated (oleic acid) in olive oil". Equally, in Europe, EFSA stated "replacing saturated fats in the diet with unsaturated fats contributes to the maintenance of normal blood cholesterol levels. Oleic acid is an unsaturated fat". Therefore, the LDL protection as well as other benefits on cardiovascular risk factors is associated to olive oil consumption.

According to Regulation EU 1308/2013, the olive oil-based functional spread fat is a product in the form of a solid, malleable emulsion (principally of the water-in-oil type) derived from a liquid vegetable oil suitable for human consumption with a fat content that can be comprised between 39 and 80%. The olive oil-based functional spread fat remains solid at 20° C.

The production of the fat spread comprises the following (FIG. 1):
  a. Olive pomace active ingredient and/or hydroxytyrosol preparation and addition of the water-soluble ingredients (aqueous phase)—Step (4);
  b. Preparation of the olive oil and addition of the fat-soluble ingredients (fat phase)—Step (4);
  c. Oil and aqueous phases blending with high-shear agitation to form a emulsion at temperatures between 40-50° C.—Step (5);
  d. Emulsion pasteurization (75-90° C.; 20 seconds)—Step (6);
  e. Cooling—Step (7);
  f. Packaging—Step (8).

The spreadable emulsion is formulated using the following ingredients:
Aqueous Phase:
  Potable water
  Salt
  Preservatives
  Flavours
  Olive pomace active ingredient and/or hydroxytyrosol
Fat Phase:
  Virgin olive oil
  Emulsifiers, thickeners, gelling agents, stabilizers
  Flavours
  Colourants
  Lipophilic vitamins.

In an embodiment, the fat spread is a standardized formulation (olive pomace active ingredient and/or hydroxytyrosol) that allows a 5 mg hydroxytyrosol (per portion).

In an embodiment, structuring agents such as pectin, gelatin, or oleogelators, among others can be used to achieve the features of a spread. Other processing ingredients can be used: mono- and diglycerides of fatty acids, distilled monoglycerides of fatty acids, citric acid esters of mono- and diglycerides of fatty acids, lecithins, polyglycerol polyricinoleate (PGPR), starch, gellam gum, locust bean gum, xanthan gum, potassium sorbate, alginate, maltodextrin, citric acid, carotenes, among others. The product can also comprise antioxidants to prevent, for example, the fatty acids oxidation such as, but not limited to, propyl gallate, tocopherol, and ascorbic acid.

In an embodiment, the olive oil-based functional spread fat also comprises the option of adding ingredients to the aqueous and/or to the fat phase, such as: cocoa, honey, syrups, cinnamon, garlic, rosemary, oregano, basil, algae, and others.

This disclosure also relates to a spreadable food composition comprising a comestible active ingredient, wherein the comestible active ingredient is obtainable by the process now disclosed.

BRIEF DESCRIPTION OF THE DRAWINGS

The following figures provide preferred embodiments for illustrating the disclosure and should not be seen as limiting the scope of invention.

DETAILED DESCRIPTION

The olive oil-based functional spread fat is composed by olive oil and bioactive ingredients. This product intends to be a functional product with positive health impact namely in cardiovascular disease markers such as plasma lipids, inflammation and oxidative stress.

This food product is a spreadable fat suitable for human consumption and intends to be used as spreadable creams and similar products in a normal daily intake.

In an embodiment, the olive oil-based functional spread fat comprises as base ingredients: extra-virgin or virgin olive oil or both, potable water, olive pomace active ingredient and/or hydroxytyrosol, herbs and/or spices, emulsifiers, thickeners, preservatives, flavours, colourants, lipophilic vitamins, or mixtures thereof.

Other ingredients can be added in variable proportions for enhancement of the product organoleptic and functional/technological properties.

The natural active ingredient is derived from olive pomace. Olive pomace is a by-product generated along the olive oil production. Olive pomace is composed mainly by fragments of olive skin, pulp and stone (solid phase) and water and oil (liquid phase). According to their solubility, phenolic compounds are distributed into the water and oil phases. Due to the olive pomace high water content (that can reach 70%) only a minimal phenolic fraction passes into the oil phase. The majority of olive fruit phenolics (98%), namely hydroxytyrosol and its derivatives (hydrophilic compounds) remain in olive pomace.

The olive oil based functional spreadable fat comprises a fat phase—olive oil—and an aqueous phase which contains the olive pomace active ingredient and/or hydroxytyrosol wherein the amount of hydroxytyrosol is at minimum 5 mg per portion.

Figure 1:
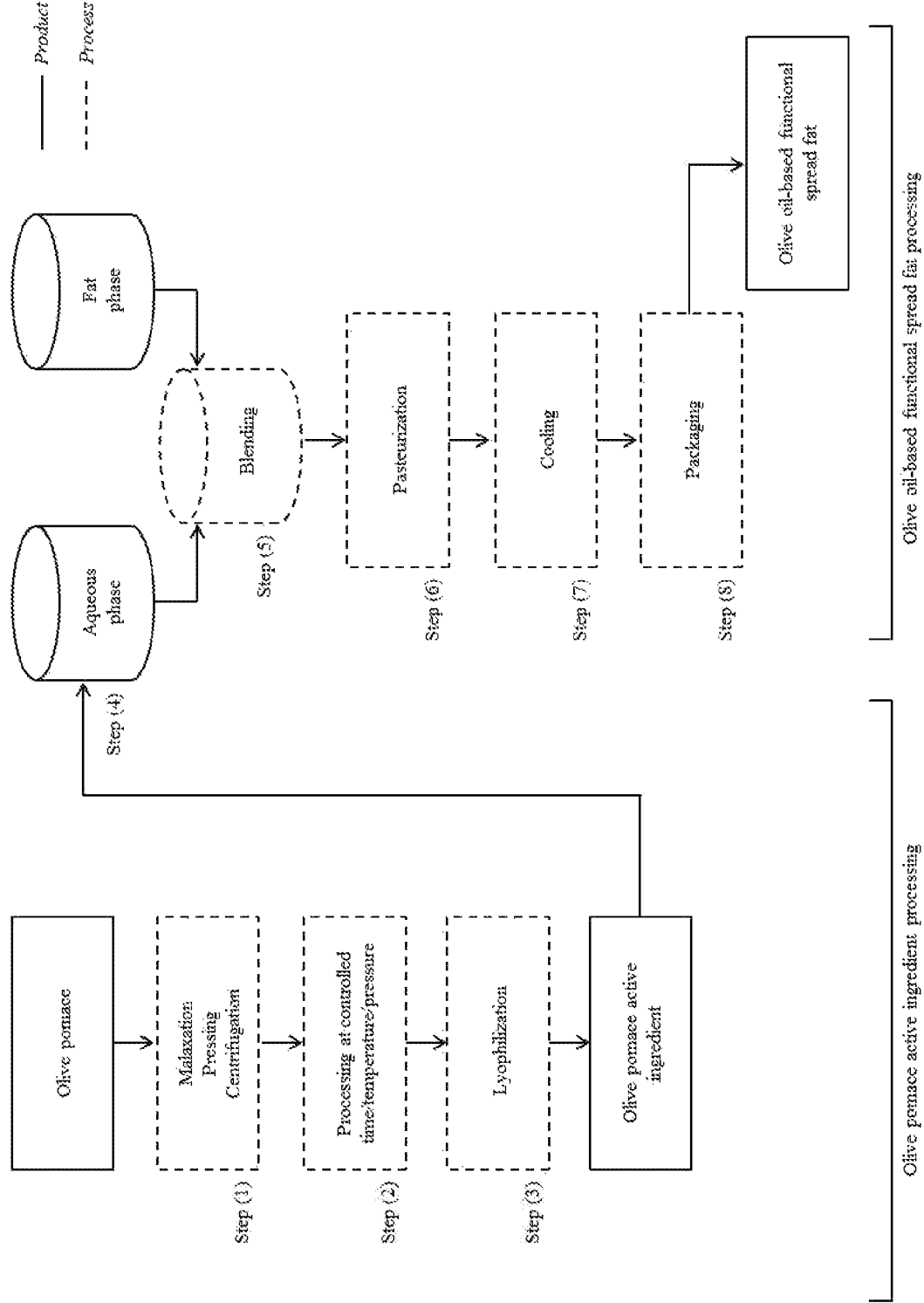
FIG. 1. Flow diagram of the olive pomace active ingredient and olive oil-based functional spread fat processings.

In order to obtain the olive active ingredient, a sequential procedure was developed (FIG. 1).

Olive pomace has a moisture content of 60%. The total fat, protein, and carbohydrates contents were 2, 3, and 34%, respectively (fresh weight). The olive pomace ash content was 1% (fresh weight) (Table 1). Considering the edapho-climatic conditions, geographical origin, and the variety of olives present in pomaces, these values can diverge.

TABLE 1

Olive pomace proximal analysis.
Olive pomace composition

| Moisture | 60 |
| --- | --- |
| Total fat | 2 |
| Protein | 3 |
| Ash | 1 |
| Carbohydrates | 34 |

Results presented in g/100 g (fresh weight).

In an embodiment, olive pomace fatty acids profile was analysed by Gas Chromatography with Flame Ionization Detection (GC-FID). The major fatty acid present is oleic acid (75%), followed by palmitic (10%), and linoleic (8%) acids. (Table 2).

TABLE 2

Fatty acids profile of the lipidic phase
of olive pomace (% relative).

| Fatty acids | Relative % |
| --- | --- |
| C14:0 (myristic) | 0.04 |
| C16:0 (palmitic) | 10.40 |
| C17:0 (heptadecanoic) | 0.13 |
| C18:0 (stearic) | 3.27 |
| C20:0 (arachidic) | 0.42 |
| C22:0 (behenic) | 0.16 |
| C24:0 (lignoceric) | 0.07 |
| C16:1 (palmitoleic) | 0.68 |
| C17:1 (cis-10-heptadecenoic) | 0.06 |
| C18:1n9c (oleic) | 75.25 |
| C18:2n6c (linoleic) | 8.46 |
| C18:3n3 (α-linolenic) | 0.80 |
| C20:1n9 (cis-11-eicosenoic) | 0.26 |

Also, Table 3 present the vitamin E profile of olive pomace. The major vitamin E vitamer present in the fat phase of olive pomace is α-tocopherol.

TABLE 3

Vitamin E profile of the lipidic phase of olive
pomace (mg/100 g of fresh weight of olive pomace).
Vitamin E

| α-tocopherol | 2.63 |
| --- | --- |
| α-tocotrienol | 0.10 |
| β-tocopherol | 0.03 |
| γ-tocopherol | 0.04 |

Results presented in mg/100 g (fresh weight).

Figure 2:
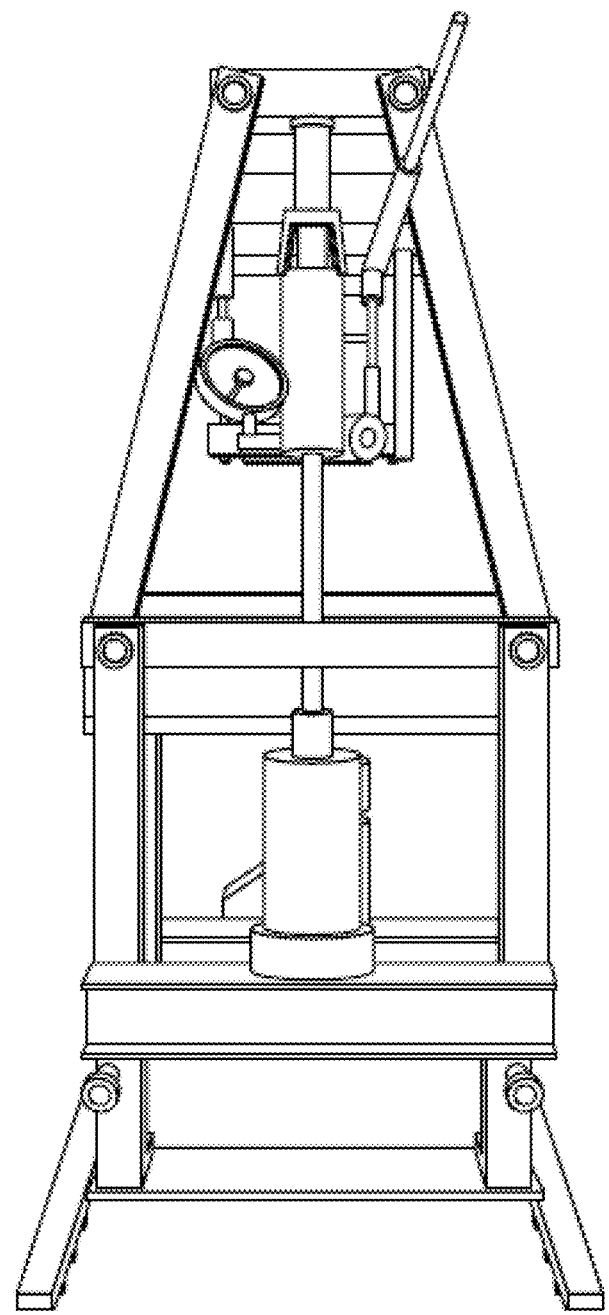
FIG. 2. Hydraulic press.

In an embodiment, olive pomace is reprocessed repeating the phase of malaxation. Then, it is pressed (200-300 bar) using a hydraulic press (FIG. 2) and then centrifuged to remove solid particles (5000 rpm; 5 min). The pressure system is set at low temperatures (until 4° C.) in order to preserve the bioactive compounds (Step (1)). The solid phase is discharged to further applications.

In an embodiment, olive mills have implemented the Hazard Analysis Critical Control Point (HACCP) principles and/or other food safety management systems. The Commission Regulation (EC) No 2073/2005 on microbiological criteria for foods regulates the food safety criteria for relevant foodborne bacteria, their toxins and metabolites. These criteria express the acceptability of a product to be placed on the market. After recovering the olive pomace active ingredient, a time/temperature/pressure combined methods (Step (2)) are used and microbiological load assessed to achieve Commission Regulation (EC) No 2073/2005 microbiological criteria.

Then, olive pomace active ingredient may be lyophilized (Step (3)) or concentrated by e.g. membranes processing, well known physical preservation methods. In addition, other technological methods can be used to concentrate the active ingredient.

In an embodiment, to assess the olive pomace active ingredient fat content, a liquid-liquid extraction was performed. Protein content and total soluble solids were evaluated by standard methodologies. Olive pomace active ingredient presented 1% of olive fat, 0.9% of protein, and a total soluble solids value of 14° Brix.

To evaluate the antioxidant activity of the olive pomace active ingredient, two complementary in vitro assays—FRAP (ferric reducing antioxidant power) and DPPH• (2,2-diphenyl-1-picrylhydrazyl) inhibition assays were used. The FRAP assay was carried using an aliquot of 35 µl mixed with 265 µl of the FRAP solution (0.3 M acetate buffer, 10 mM TPTZ solution and 20 mM of ferric chloride). The mixture was kept for 30 min at 37° C. protected from light. A calibration curve was prepared with ferrous sulfate and the absorbance measured at 595 nm.

In an embodiment, the radical scavenging ability of the antioxidants present in the olive pomace active ingredient was assessed according to the following procedure: the reaction was initiated by transferring diluted 30 µL sample extracts to 270 µL of a DPPH$^{\bullet}$ solution ($6.0 \times 10^{-5}$ mol/L in ethanol). The absorbance decrease was monitored in equal time intervals at 525 nm, in order to observe the kinetic reaction. A calibration curve was prepared with trolox.

In an embodiment, the olive pomace active ingredient presents high antioxidant activity. FRAP assay showed a reducing antioxidant power of 97984 µmol ferrous sulfate equivalents/L and the DPPH$^{\bullet}$ radical scavenging activity was of 8464 mg trolox equivalents/L (Table 2). This means that the olive pomace water phase comprises great amounts of antioxidant compounds that are extracted naturally from the olive pomace matrix. Overall, the olive pomace active ingredient is a concentrated of the olive hydrophilic phenolic compounds.

In an embodiment, the total phenolics and flavonoids content were also evaluated. The total amount of phenolic compounds was quantified by the Folin-Ciocalteu method using gallic acid as standard: 30 µL of each extract were mixed with 150 µL of Folin-Ciocalteu reagent and 120 µL of a sodium carbonate solution. The mixture was incubated at 45° C., protected from light, during 15 min. After 30 min at room temperature, the absorbance was measured at 765 nm.

In an embodiment, total flavonoids content was determined by a colorimetric assay based on the formation of flavonoid-aluminium compound in which 1 mL of each sample was mixed with 4 mL of dezionized water and 300 µL of $NaNO_2$ 5% solution. After 5 min, 300 mL of $AlCl_3$ 10% were added to the solution and then it was added 2 mL of NaOH 1 M and dezionized water. The final solution was mixed and the absorbance read at 510 nm. Epicatechin was used to plot the standard curve.

In an embodiment, high content in phenolics and flavonoids were determined in the active olive pomace active ingredient, respectively 9695 mg gallic acid equivalents/L and 8265 mg epicatechin equivalents/L (Table 2).

TABLE 2

Olive pomace active ingredient phytochemicals (total phenolics and flavonoids) and in vitro antioxidant activity (DPPH$^{\bullet}$ scavenging activity and FRAP assays).

| | Phytochemicals | | Antioxidant activity | |
|---|---|---|---|---|
| | Total phenolics (mg GAE/L) | Total flavonoids (mg EE/L) | FRAP (µmol FSE/L) | DPPH$^{\bullet}$ (mg ET/L) |
| Olive pomace active ingredient | 9695 | 8265 | 97984 | 8464 |

FRAP, ferric-reducing antioxidant power; DPPH$^{\bullet}$, 2,2-diphenyl-1-picrylhydrazyl scavenging activity; GAE, gallic acid equivalents; EE, epicatechin equivalents; TE, trolox equivalents; FSE, ferrous sulfate equivalents.

Figure 3:
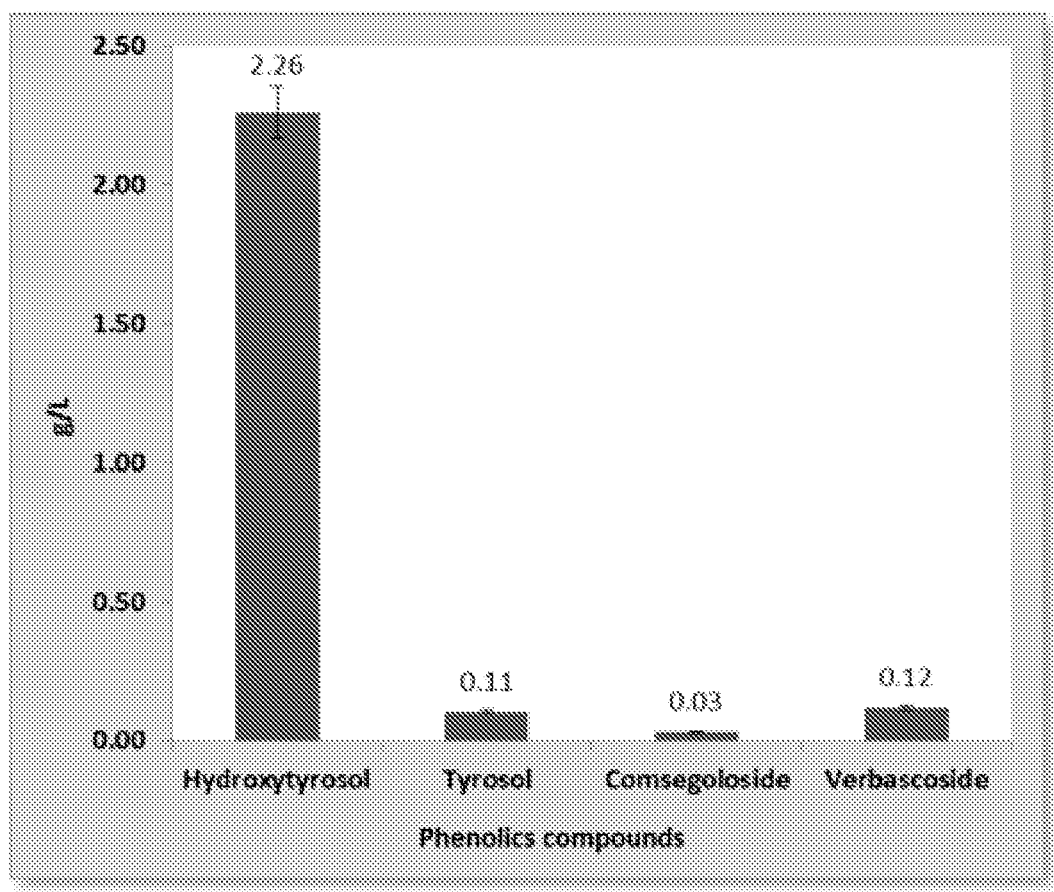
FIG. 3. Olive pomace active ingredient phenolic profile.
Figure 4:
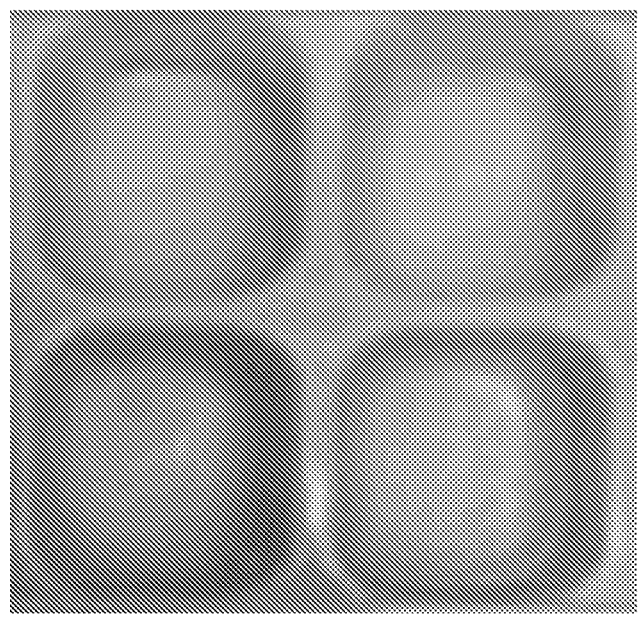
FIG. 4. Virgin olive oil enriched with olive pomace aqueous extract and processed—a preliminary study.

In an embodiment, a chromatographic analyse was conducted in an HPLC-DAD-FLD system to evaluate the phenolics profile. The major phenolics detected were hydroxytyrosol, tyrosol, comsegoloside, verbascoside, and verbascoside derivatives. Hydroxytyrosol content in the olive pomace active ingredient was 2.26 g/L. Tyrosol, comsegoloside, and verbascoside contents were 0.11, 0.03, and 0.12 g/L, respectively (FIG. 3).

In an embodiment, the main dietary sources of hydroxytyrosol are olive oils and table olives. In these food products, hydroxytyrosol is not only available in a free form, but also present in the conjugated forms of oleuropein and oleuropein-aglycones. The hydroxytyrosol content is variable because it depends on the variety and degree of ripeness of olives. Hydroxytyrosol in oil is present in the free form, in acetate form or as a part of more complex compounds as oleacein, oleuropein, and verbascoside. The hydroxytyrosol from oleuropein and oleuropein-aglycone are also bioavailable. According to EFSA, the hydroxytyrosol content in olive oil can vary between 0.0035 g (virgin olive oils) and 0.0077 (extra-virgin olive oils) g/kg whereas in black olives is 0.66 g/kg and in green olives 0.56 g/kg. EFSA reports related with the consumption of olive oils and olives in the European Union, indicates that the free hydroxytyrosol daily intake range from 0.00015 to 0.004 mg/kg body weight per day for olive oils and 0.018 to 0.185 mg/kg body weight per day for olives (for adults aged between 18-64 years).

Minerals have important key roles in the body functions such as transmitting the nerve impulses, hormone and oxidative stress regulation, and control of the heartbeat. Minerals have also important roles in the regulation of glucose levels (e.g. Cr), formation of erythrocyte cells (e.g. Co, I, and Fe), protection of immune system (e.g. Ca, Mg, Cu, Se, and Zn), maintenance of electrolytes balance, heart function, muscle contraction and nerve transmission (e.g. Na), development of the connective tissue and maintenance of the skin structural integrity (e.g. S), and are part of antioxidant enzymes (e.g. Se, Zn, Mo, Mn). Macro minerals as Ca and K have influence on the blood pressure regulation and blood clotting.

In an embodiment, Ion composition of the olive pomace active ingredient was analysed with Inductively Coupled Plasma Atomic Emission Spectroscopy (ICP-AES). The major elements present are K>Ca>S>Si>P. K and Ca are the major mineral present (149 mg/L and 9 mg/L, respectively) (Table 3). In olive oil, K can vary between 0.05 and 2.14 mg/kg and Ca values can range between 0.63 and 76 mg/kg. Other elements are present in olive oil such as Fe, Cu, Ni, Zn, Mn, Co, Cr, Mg, and Na.

TABLE 3

Semi-quantitative analysis of the olive pomace active ingredient (mg/L).

| Element | Olive pomace active ingredient (mg/L) |
|---|---|
| Ca | 8.5 |
| Cu | 0.1 |
| Fe | 0.3 |
| K | 149.2 |
| Mn | 0.1 |
| Na | 0.4 |
| P | 0.8 |
| S | 6.7 |
| Si | 1.1 |
| Zn | 0.4 |

In an embodiment, a study was performed in order to study the effect of adding an olive pomace extract to extra-virgin olive oil. An aqueous extract was obtained directly from olive pomace (1:50 (m/v); 40° C.; 60 min; 600 rpm) and tested by adding to extra-virgin olive oil different concentrations (10%, 5%, 3%, 2.5%, 2%, 1% and 0.5%). The final selected concentrations were 0.5, 1 and 2%.

In an embodiment, the total phenolics content of the extract was evaluated (107 mg gallic acid equivalents/L). The solution composed by olive pomace extract and olive oil was first sonicated during 20 min and then submitted to agitation (60 min). Oxidative stability, fatty acids profile, total phenolics, acidity, and peroxide value were evaluated over time (0, 28, 56, 84 days). Simultaneously, freezing (T=−20° C.) was studied as a preservation method.

In an embodiment, after 84 days, the deterioration of the matrix, evaluated by the oxidative stability, was delayed in the samples with extract (mean induction time=9.85 h), compared to the sample of extra-virgin olive oil (mean induction time=8.38 h). Therefore, it was observed a positive influence of the addition of extract in oxidative stability. Relatively to fatty acids profile, significant changes were not observed. Free fatty acids levels, evaluated by acidity, were stable over time and in accordance to Regulation EU No 1348/2013. Peroxide value is used as an estimation of oxidation. The samples with extract presented a stable peroxide value during the study (≤20 mEq O2/kg).

The samples only contained the natural antioxidants present in the matrix not being added any type of preservative. The product was spreadable after 15 min of being removed from the freeze.

In an embodiment, the olive oil-based functional spreadable fat emulsion, preferably W/O emulsion, is produced using the following process (FIG. 1):
  a. Preparation of the aqueous phase—Step (4)
  Potable water
  Salt
  Preservatives
  Flavours
  Olive pomace active ingredient and/or hydroxytyrosol
  b. Preparation of the fat phase—Step (4)
  Virgin olive oil (39-80%)
  Emulsifiers, thickeners, gelling agents, stabilizers
  Flavours
  Colourants
  Lipophilic vitamins
  c. Oil and aqueous phases blending with high-shear agitation to form a W/O emulsion at temperature between 40-50° C.—Step (5)
  d. Emulsion pasteurization (75-90° C.; 20 seconds)—Step (6)
  e. Cooling—Step (7)
  f. Packaging—Step (8)

In an embodiment, the fat spread is a standardized formulation (olive pomace active ingredient and/or hydroxytyrosol) that allows a 5 mg hydroxytyrosol (per portion).

In an embodiment, olive oil bitterness and pungency and/or astringency has been correlated with the presence of phenolics. These sensory properties can even rise when olive oil is fortified with phenolic compounds, namely hydroxytyrosol which cannot be pleasant for some consumers. Therefore, the utilization of ingredients as cocoa, honey, cinnamon, garlic, rosemary, oregano, basil, algae, among others, can be helpful to maintain the beneficial nutritional profile and to neutralize the sensory properties natural occurring when it is added phenolics to a food matrix for consumers.

Also, the utilization of other technological agents as enzymes that reduce the bitterness are comprised.

Where singular forms of elements or features are used in the specification of the claims, the plural form is also included, and vice versa, if not specifically excluded. For example, the term "a ingredient" or "the ingredient" also includes the plural forms "ingredient" or "the ingredients," and vice versa. In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention also includes embodiments in which more than one, or all of the group members are present in, employed in, or otherwise relevant to a given product or process.

Furthermore, it is to be understood that the invention encompasses all variations, combinations, and permutations in which one or more limitations, elements, clauses, descriptive terms, etc., from one or more of the claims or from relevant portions of the description is introduced into another claim. For example, any claim that is dependent on another claim can be modified to include one or more limitations found in any other claim that is dependent on the same base claim.

Where ranges are given, endpoints are included. Furthermore, it is to be understood that unless otherwise indicated or otherwise evident from the context and/or the understanding of one of ordinary skill in the art, values that are expressed as ranges can assume any specific value within the stated ranges in different embodiments of the invention, to the tenth of the unit of the lower limit of the range, unless the context clearly dictates otherwise. It is also to be understood that unless otherwise indicated or otherwise evident from the context and/or the understanding of one of ordinary skill in the art, values expressed as ranges can assume any subrange within the given range, wherein the endpoints of the subrange are expressed to the same degree of accuracy as the tenth of the unit of the lower limit of the range.

The disclosure should not be seen in any way restricted to the embodiments described and a person with ordinary skill in the art will foresee many possibilities to modifications thereof.

The above described embodiments are combinable.

The following claims further set out particular embodiments of the disclosure

The invention claimed is:

1. A spreadable food composition, comprising:
  a comestible active ingredient derived from olive pomace, wherein the active ingredient derived from olive pomace has at least 9695 mg gallic acid equivalents/L of total phenolics and 8265 mg epicatechin equivalents/L of total flavonoids; and
  at least a compound selected from the group consisting of: hydroxytyrosol, tyrosol, comsegoloside, verbascoside, and combinations thereof,
  wherein the comestible active ingredient derived from olive pomace is obtained by a process comprising the following steps:
  malaxating of olive pomace;
  compressing the olive pomace, at 50-300 bar;
  separating a solid phase from an oil phase and from an aqueous phase;
  discharging the solid phase;
  centrifugating the oil phase and the aqueous phase at 5000 rpm for 5 min;

wherein the composition comprises at least 5 mg the compound/10 g spreadable food composition; and wherein the comestible active-ingredient itself includes 0.01 g/L-2.26 g/L of at least one of hydroxytyrosol, tyrosol, comsegoloside, verbascoside, and combinations thereof; and wherein the comestible active ingredient comprises hydroxytyrosol, tyrosol, comsegoloside, verbascoside, verbascoside derivatives, sterols, tocopherols, triterpenes, coenzyme Q10, potassium, magnesium, calcium, oleic acid, palmitic acid, linoleic acid, and mixtures thereof; and wherein said composition comprises an oil phase and an aqueous phase, wherein the oil phase is olive oil; and the aqueous phase comprises the comestible active ingredient derived from olive pomace.

2. The foodstuff composition according to claim 1, wherein the composition comprises hydroxytyrosol and a second compound selected from the list consisting of: tyrosol, comsegoloside, verbascoside, and combinations thereof.

3. The spreadable food composition according to claim 1, comprising at least 5 mg of hydroxytyrosol per 10 g of spreadable food composition.

4. The foodstuff composition according to claim 1, wherein composition comprises hydroxytyrosol and wherein the comestible active ingredient comprises a concentration of hydroxytyrosol of at least 2.26 g/L.

5. The spreadable food composition according to claim 1, wherein the comestible active ingredient comprises a concentration of tyrosol of at least 0.11 g/L.

6. The foodstuff composition according to claim 1, wherein the composition comprises comsegoloside and wherein the comestible active ingredient comprises a concentration of comsegoloside of at least 0.03 g/L.

7. The foodstuff composition according to claim 1, wherein the composition comprises verbascoside and wherein the comestible active ingredient comprises a concentration of verbascoside of at least 0.12 g/L.

8. The spreadable food composition according to claim 1, further comprising pectin, gelatin, oleogelators, or combinations thereof.

9. The spreadable food composition according to claim 1, further comprising herbs, spices, emulsifiers, thickeners, preservatives, flavours, colourants, lipophilic vitamins, or combinations thereof.

10. The spreadable food composition according to claim 1, further comprising mono- and diglycerides of fatty acids, distilled monoglycerides of fatty acids, citric acid esters of mono- and diglycerides of fatty acids, lecithins, polyglycerol polyricinoleate (PGPR), starch, gellan gum, locust bean gum, xanthan gum, potassium sorbate, alginate, maltodextrin, citric acid, carotenes, or combinations thereof.

11. The spreadable food composition according to claim 1, further comprising propyl gallate, tocopherol, ascorbic acid, or combinations thereof.

12. The spreadable food composition according to claim 1, further comprising cocoa, honey, syrups, cinnamon, garlic, rosemary, oregano, basil, algae, or combinations thereof.

* * * * *